(12) United States Patent
Zhan et al.

(10) Patent No.: US 8,965,015 B2
(45) Date of Patent: Feb. 24, 2015

(54) SIGNAL PROCESSING METHOD, SYSTEM, AND APPARATUS FOR 3-DIMENSIONAL AUDIO CONFERENCING

(75) Inventors: Wuzhou Zhan, Shenzhen (CN); Dongqi Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 560 days.

(21) Appl. No.: 13/090,417

(22) Filed: Apr. 20, 2011

(65) Prior Publication Data

US 2011/0194701 A1    Aug. 11, 2011

Related U.S. Application Data

(63) Continuation of application No. PCT/CN2009/074528, filed on Oct. 20, 2009.

(30) Foreign Application Priority Data

Oct. 20, 2008   (CN) .......................... 2008 1 0217091
Oct. 27, 2008   (CN) .......................... 2008 1 0171240

(51) Int. Cl.
*H04R 5/02*   (2006.01)
*H04M 3/56*   (2006.01)
(Continued)

(52) U.S. Cl.
CPC . *H04M 3/56* (2013.01); *H04S 7/30* (2013.01); *H04S 2400/11* (2013.01); *H04S 2400/15* (2013.01)
USPC ..................................... 381/310; 379/202.01

(58) Field of Classification Search
CPC ....................................................... H04M 3/56
USPC ................... 381/310, 17, 92; 379/202.1, 158, 379/204.01
See application file for complete search history.

(56) References Cited

U.S. PATENT DOCUMENTS 8,208,664 B2 *   6/2012   Iwasaki .......................... 381/310
8,385,233 B2 *   2/2013   Crinon et al. .................. 370/260
(Continued)

FOREIGN PATENT DOCUMENTS

CN      1722752 A     1/2006
CN      1849834 A    10/2006
(Continued)

OTHER PUBLICATIONS

Written Opinion of the International Searching Authority in corresponding PCT Application No. PCT/CN2009/074528 (Jan. 28, 2010).

(Continued)

*Primary Examiner* — Vivian Chin
*Assistant Examiner* — Ammar Hamid
(74) *Attorney, Agent, or Firm* — Leydig, Voit & Mayer, Ltd.

(57) ABSTRACT

The present invention discloses a signal processing method, system and apparatus for 3-dimensional (3D) audio conferencing. The implementation is: a server obtains at least one audio stream relative to one terminal; the server allocates identifiers for the obtained at least one audio stream relative to the terminal; and the server combines the obtained at least one audio stream and the identifiers of the at least one audio stream and sends the combination to the terminal. With the technical solution of the present invention, the issue of excessive transmission channels required in the prior art is resolved and the terminal is capable of determining the sound image positions of other terminals freely.

22 Claims, 17 Drawing Sheets

(51) Int. Cl.
*H04S 7/00* (2006.01)
*H04M 3/42* (2006.01)

(56) References Cited

U.S. PATENT DOCUMENTS

| | | | |
|---|---|---|---|
| 8,422,406 B2 * | 4/2013 | Ashbrook et al. | 370/265 |
| 2007/0127671 A1 * | 6/2007 | Chua et al. | 379/202.01 |
| 2008/0051029 A1 | 2/2008 | Witteman et al. | |

FOREIGN PATENT DOCUMENTS

| | | | |
|---|---|---|---|
| CN | 101129089 A | | 2/2008 |
| CN | 101133441 A | | 2/2008 |
| CN | 101384105 A | | 3/2009 |
| CN | 101547265 A | | 9/2009 |
| EP | 1954019 A | | 8/2008 |
| EP | 1954019 A1 | * | 8/2008 |
| GB | 2416955 A | | 2/2006 |
| WO | WO 2007/026025 A2 | | 3/2007 |

OTHER PUBLICATIONS

1st Office Action in corresponding Chinese Application No. 200810217091.9 (Dec. 31, 2010).

1st Office Action in corresponding Chinese Application No. 200810171240.2 (Sep. 25, 2009).

2nd Office Action in corresponding Chinese Application No. 200810171240.2 (May 19, 2010).

3rd Office Action in corresponding Chinese Application No. 200810171240.2 (Sep. 17, 2010).

Lin et al., "Sound Source Localization Based on Microphone Array," May 2004, China Academic Journal Electronic Publishing House, China.

International Search Report in corresponding PCT Application No. PCT/CN2009/074528 (Jan. 28, 2010).

Extended European Search Report in corresponding European Patent Application No. 09821590.8 (Jun. 26, 2013).

* cited by examiner

SIGNAL PROCESSING METHOD, SYSTEM, AND APPARATUS FOR 3-DIMENSIONAL AUDIO CONFERENCING

CROSS-REFERENCE TO RELATED APPLICATIONS

This application is a continuation of International Application No. PCT/CN2009/074528, filed on Oct. 20, 2009, which claims priority to Chinese Patent Application No. 200810217091.9, filed on Oct. 20, 2008 and Chinese Patent Application No. 200810171240.2, filed on Oct. 27, 2008, all of which are hereby incorporated by reference in their entireties.

FIELD OF THE INVENTION

The present invention relates to audio processing technologies, and in particular, to a signal processing method, system, and apparatus for 3-dimensional (3D) audio conferencing.

BACKGROUND OF THE INVENTION

The current audio conferencing systems generally work on one sound channel or dual sound channels and do not provide the sense of presence. In the case of a multi-point conference, in particular, the sounds from all sources are mixed and, as a result, the clearness of the sounds declines.

In a prior art, audio streams of an audio conference are processed through 3D audio processing. That is, the gain on the left and right sound channels of an audio stream is adjusted according to the sound image position allocated for the audio stream and the spatial relationship between the audio streams in different sound image positions so as to create a stereo effect.

The prior art provides a distributed network structure for 3D audio conferencing, where, every terminal receives the conference data from all other terminals and performs 3D positioning on all the audio data so that the user feels that different audio streams come from different positions. As shown in FIG. 1, terminal 2 receives the conference data of terminal 1 and terminal 3 and then performs 3D positioning on the audio data to determine the positions of terminal 1 and terminal 3. Another solution in the prior art adopts centralized networking. The conferencing system shown in FIG. 2 includes one server and multiple terminals. All terminals send their audio data to the server and the server performs 3D positioning on the audio streams sent to each terminal and then sends the processed audio streams to the appropriate terminals.

During the implementation of the present invention, the inventor finds at least the following weaknesses in the prior art: regarding the distributed 3D audio conferencing solution, because audio data is processed on the distributed terminals, there must be many transmission channels and therefore, the solution is applicable to only small conferencing systems with a few conference sites; regarding the centralized 3D audio conferencing solution, because all data processing is carried out on the server, the server must know the player configuration of all terminals in advance and a terminal cannot determine the sound image positions of other terminals freely.

SUMMARY OF THE INVENTION

To overcome the weaknesses in the prior art, embodiments of the present invention provide a signal processing method, server, terminal, and system for 3D audio conferencing to resolve the issue of excessive transmission channels required in the prior art and the inability of a terminal to freely determine the sound image positions of other terminals.

A signal processing method for 3D audio conferencing includes:
  obtaining, by a server, at least one audio stream relative to one terminal;
  allocating, by the server, identifiers for the obtained at least one audio stream relative to the terminal; and
  by the server, combining the obtained at least one audio stream relative to the terminal and the identifiers allocated for the at least one audio stream and sending the combination to the target terminal.

A signal processing server for 3D audio conferencing includes:
  an audio stream obtaining unit, adapted to obtain audio streams relative to one terminal;
  an identifier allocating unit, adapted to allocate identifiers for the obtained audio streams relative to the terminal; and
  a combination sending unit, adapted to combine the obtained audio streams relative to the terminal and the identifiers of the audio streams and send the combination to the target terminal.

A signal processing terminal for 3D audio conferencing includes:
  an obtaining unit, adapted to obtain at least one audio stream that carries identifier information;
  an audio processing unit, adapted to: extract the identifier information of the at least one audio stream obtained by the obtaining unit, distribute audio streams according to the identifier information, and decode the multiple audio streams;
  a sound image position allocating unit, adapted to allocate sound image positions for the decoded multiple audio streams according to the identifier information extracted by the audio processing unit; and
  a 3D audio processing unit, adapted to perform 3D audio processing on the decoded multiple audio streams according to the allocated sound image positions.

Another signal processing method for 3D audio conferencing includes:
  obtaining multiple audio streams that carry identifier information and extracting the identifier information from the obtained audio streams;
  distributing audio streams that carry a same identifier according to the extracted identifier information;
  allocating sound image positions for the distributed audio streams according to the extracted identifier information; and
  decoding the distributed audio streams and performing 3D audio processing on the decoded audio streams according to the sound image positions of the audio streams.

A 3D audio conferencing system includes:
  a server, adapted to: obtain at least one audio stream relative to one terminal; allocate identifiers for the obtained at least one audio stream relative to the terminal; and combine the obtained at least one audio stream relative to the terminal and the identifiers of the at least one audio stream and send the combination to the target terminal; and
  at least one target terminal, adapted to: obtain the at least one audio stream that carries identifier information, extract the identifier information of the audio streams, distribute audio streams that carry a same identifier according to the identifier information, and allocate sound image positions for the distributed audio streams according to the extracted identifier information; and decode the distributed audio streams and perform 3D audio processing on the distributed audio streams according to the sound image positions of the audio streams.

With the technical solution provided by the embodiments of the present invention, one terminal is capable of determining the sound image positions of other terminals according to the audio streams received from the other terminals and the identifiers allocated for the audio streams.

BRIEF DESCRIPTION OF THE DRAWINGS

The accompanying drawings are provided herein to help further understand the present invention and constitute a part of the application without limiting the present invention. In the accompanying drawings.

DETAILED DESCRIPTION OF THE EMBODIMENTS

To better explain the purpose, technical solution and benefits of the present invention, the embodiments of the present invention are hereinafter described in detail with reference to the accompanying drawings. Here, the exemplary embodiments of the present invention and related descriptions are intended to explain the present invention without limiting the present invention.

METHOD EMBODIMENTS

Method Embodiment 1

Figure 1:
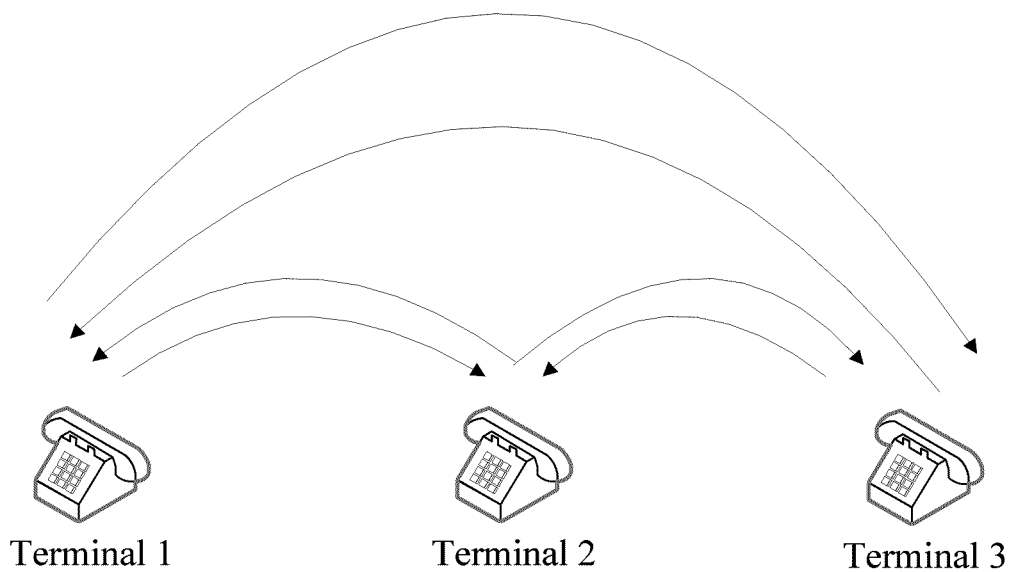
FIG. 1 illustrates a network diagram of a distributed 3D audio conferencing system in a prior art.
Figure 2:
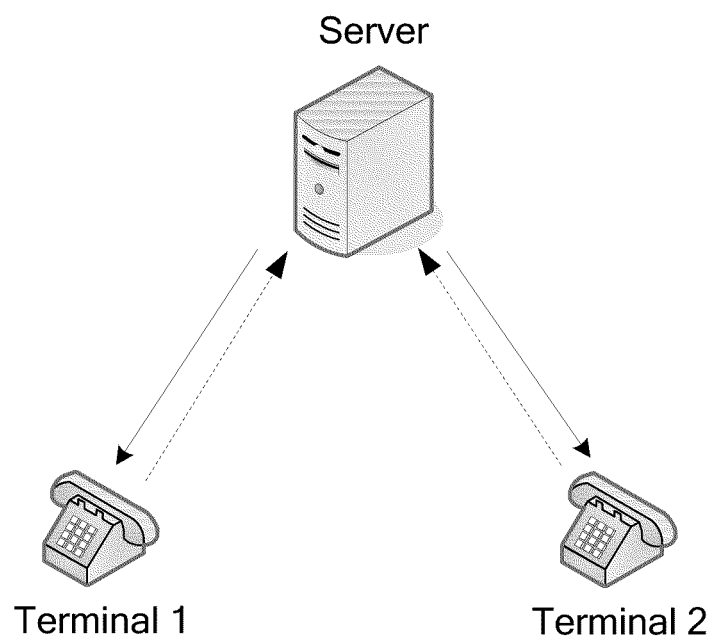
FIG. 2 illustrates a network diagram of a centralized 3D audio conferencing system in the prior art.
Figure 3:
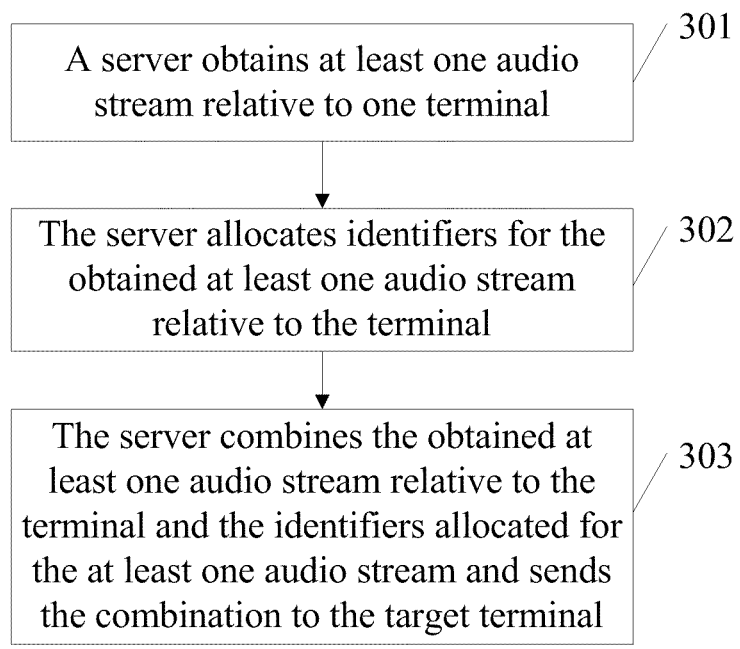
FIG. 3 illustrates a flow chart of a first method embodiment of the present invention.

The first method embodiment of the present invention is illustrated in FIG. 3. The method includes the following steps:

301. With respect to one terminal, the server obtains at least one audio stream relative to the terminal.

In this step, specifically, the server obtains the energy of multiple audio streams relative to the terminal and selects at least one audio stream of the highest energy according to the energy of the multiple audio streams.

It is understood that obtaining multiple audio streams of the highest energy with respect to one terminal is only one implementation approach. Alternatively, the server may obtain all audio streams. The implementation approach is that the server obtains related audio streams directly without the need to calculate the energy.

302. The server allocates identifiers for the obtained at least one audio stream relative to the terminal.

Specifically, an identifier allocated for the at least one audio stream is a conference site number or a terminal number. Alternatively, the identifier may be allocated manually by the conference administrator or allocated by the conference management system in real time.

For example, when there is only one terminal at one conference site, using the site number to identify the at least one audio stream of the highest energy relative to one terminal obtained in step 301 will not cause confusion.

When there is more than one terminal at one site, an audio stream cannot be identified by a site number. Because different terminals obtain different audio streams, to differentiate the multiple audio streams that come from one conference site, a sequence number is allocated for each of the multiple audio streams from the site. This sequence number may be the terminal number corresponding to the audio stream. The server allocates a sequence number for each terminal connected with the server. When the server obtains an audio stream relative to a terminal in step 301, the identifier allocated for the audio stream in this step may be the terminal number of the terminal corresponding to the audio stream. Thus, the audio streams obtained by different terminals can be differentiated more effectively.

If the audio stream obtained in step 301 also carries the position information of the sound source corresponding to the audio signal in the audio stream, the identifier allocated for the audio stream may be a combination of the terminal number and the position information. The position information is generally carried in the Real-time Transport Protocol (RTP, applicable to the transport of video, audio, and other delay-sensitive data) header of the audio stream. After obtaining the audio stream relative to the terminal in step 301, the server inspects the RTP header of the audio stream to obtain the position information. For example, the server determines whether the header carries position information by inspecting the flag in a field of the header, where the flag corresponding to position information in the field is set by the terminal. Or, the server may inspect whether the value of a related field is 0 or 1 to determine whether position information is carried. Those skilled in the art can implement multiple inspection methods based on common technical information. Then, the server combines the terminal number corresponding to the audio stream and the position information in the audio stream into an identifier and allocates the identifier for the audio stream. Because the position information varies in each audio stream, the identifier allocated for the audio stream may also be a combination of the site number and the position information.

Based on the above understanding, the identifier of an audio stream in the embodiment of the present invention is only a symbol allocated for the audio stream for the purpose of differentiating the audio stream. Other identifier obtaining methods can be derived from the embodiment of the present invention. The identifier obtaining method is not limited by the invention.

303. The server combines the at least one audio stream obtained relative to the terminal and the identifiers allocated for the at least one audio stream and sends the combination to the target terminal.

In this step, the server may combine the at least one audio stream obtained relative to the terminal and the identifiers allocated for the at least one audio stream in the following approaches:

loose combination: the server makes no change to the obtained audio streams and adds the identifiers allocated for the at least one audio stream in step 302 in protocol headers when encapsulating audio data frames; and/or tight combination: the server encodes/decodes the obtained single-channel audio streams, combines the encoded/decoded single-channel audio streams into one multi-channel stream, and adds the identifiers allocated for the at least one audio stream in step 302 corresponding to the multiple channels in frame headers of the multi-channel stream.

It should be noted that the server may combine the audio streams relative to the terminal and the identifiers allocated for the audio streams through loose combination, tight combination, or both loose combination and tight combination.

The identifier of an audio stream may be carried in the header of Internet Protocol (IP) packets or the frame header of audio frames.

With the technical solution of the embodiment of the present invention, one terminal is capable of determining the sound image positions of other terminals freely according to the audio streams received from the other terminals and the identifiers allocated for the audio streams. Especially, when the audio streams carry the position information of sound sources, the terminal can determine the sound image positions of other terminals more precisely according to the position information of the sound sources.

Method Embodiment 2

Figure 4:
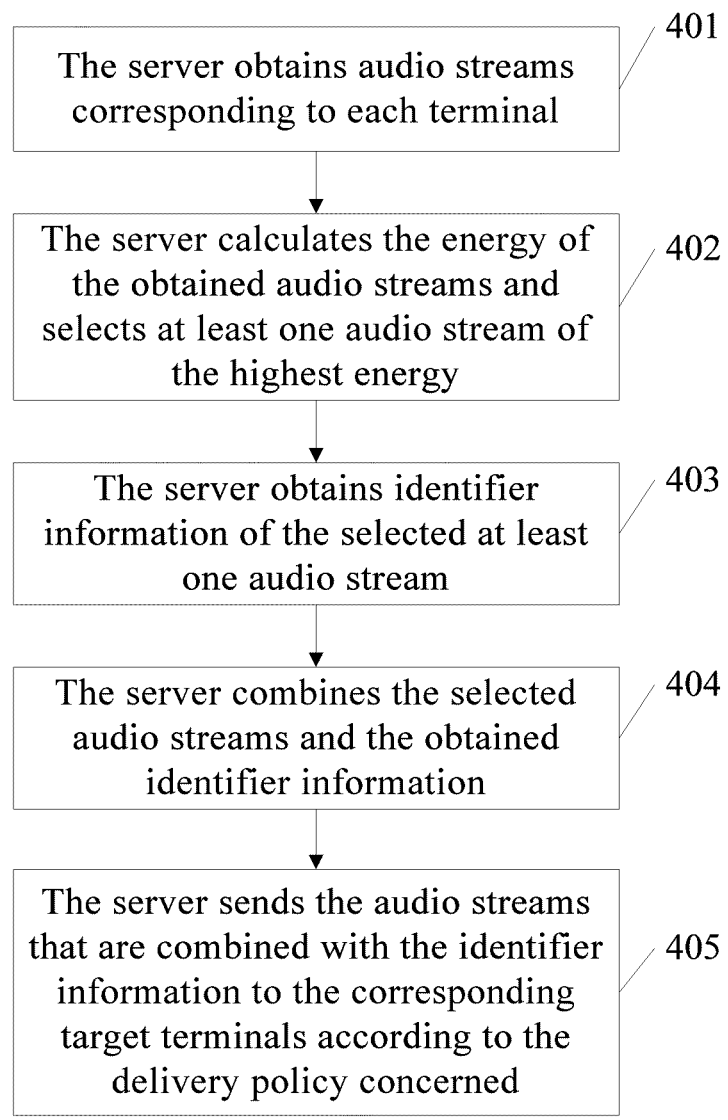
FIG. 4 illustrates a flow chart of a second method embodiment of the present invention.

The second method embodiment of the present invention is applicable where there is only one server. The processing is illustrated in the flowchart shown in FIG. 4.

401. The server obtains audio streams corresponding to each terminal.

In this step, there is generally one terminal at one conference site and each terminal obtains the audio streams of corresponding conference sites, equivalent to the effect that the server of each terminal obtains the audio streams corresponding to the terminal.

402. The server calculates the energy of the obtained audio streams and selects at least one audio stream of the highest energy.

In this step, the server calculates the energy of the audio streams corresponding to each terminal obtained in step 401 and selects at least one audio stream of the highest energy according to the calculation result as the finally selected audio streams.

The energy of an audio stream may be calculated in the following methods:

(1) Calculate the audio energy of the decoded audio stream within the duration of one frame in the time domain and obtain an average value from the energy of several frames of the audio signal; or (2) Calculate the audio energy of the decoded audio stream within the frequency range of the frequency domain and obtain an average value from the energy of several frames of the audio signal; or (3) Decode the quantization factor of the audio stream and estimate the energy of the audio stream.

The calculation of audio stream energy can be categorized into two types. One type is based on decoding, corresponding to (1) and (2); the other type is base on non-decoding estimation, corresponding to (3). The two types of calculation are used for different protocols. For certain audio protocols, such as G.723.1 and G.729, the energy of an audio stream can be calculated only when the audio stream is completely decoded. For other audio protocols, such as G.722.1 and Advanced Audio Coding Low Delay (AAC LD), the energy of an audio stream can be estimated when certain parameters of the audio stream are decoded.

After the energy of the audio streams is estimated, the server may select at least one audio stream of the highest energy according to the policy of audio conferencing as the selected audio streams.

It is understood that the calculation of the energy of audio streams to select at least one audio stream of the highest energy is only one approach of audio stream selection. Alternatively, the server may select all audio streams at all conference sites without calculating the energy of the audio streams.

403. The server obtains the identifier information of the selected at least one audio stream.

In this step, the server obtains the identifier information corresponding to the selected at least one audio stream.

The identifier information of the selected audio stream may be specifically the conference site number or terminal number corresponding to the audio streams. If the obtained audio streams carry the position information of the sound sources corresponding to the audio signals in the audio streams, the multiple audio streams may also be identified by a combination of the terminal number and the position information or a combination of the site number and the position information.

Generally, if there is only one terminal at the conference site, the site number is adopted as the identifier of an audio stream.

If there is one or more terminals at the site and the audio stream carries the position information of the sound source of the audio signal, the audio stream is identified by a combination of the terminal number and the position information or a combination of the site number and the position information. The position information of an audio stream can be obtained by inspecting the RTP header of the audio stream.

It is understood that the identifier of an audio stream in the embodiment of the present invention is only a symbol allocated for the audio stream for the purpose of differentiating the audio stream. The identifier may also be allocated manually by the conference administrator or allocated by the conference management system in real time. Therefore, other identifier obtaining methods can be derived from the embodiment of the present invention. The identifier obtaining method is not limited by the present invention.

404. The server combines the selected audio streams and the obtained identifier information.

In this step, the server combines the selected at least one audio stream and the obtained identifier information of the selected audio streams.

The combination methods include:

loose combination: the server makes no change to the obtained audio streams and adds the identifiers of the at least one audio stream obtained in step 403 in protocol headers when encapsulating audio data frames; and/or tight combination: the server encodes/decodes the obtained single-channel audio streams, combines the encoded/decoded single-channel audio streams into one multi-channel stream, and adds the audio stream identifiers corresponding to the multiple channels, that is, the identifiers obtained in step 403, in frame headers of the multi-channel stream.

It should be noted that the server may combine the audio stream relative to the terminal and the identifier of the audio stream through loose combination, tight combination, or both loose combination and tight combination.

405. The server sends the audio streams that are combined with the identifier information to the corresponding target terminals according to the related delivery policy.

In this step, the server may send the audio streams combined with the identifier information to the corresponding target terminals according to the following policy:

If the selected audio streams include the audio stream obtained by one terminal, the audio streams sent to the terminal are the selected audio streams except the audio stream obtained by the terminal; if the selected audio streams do not include the audio stream obtained by one terminal, the audio streams sent to the terminal are all selected audio streams.

Figure 5A:
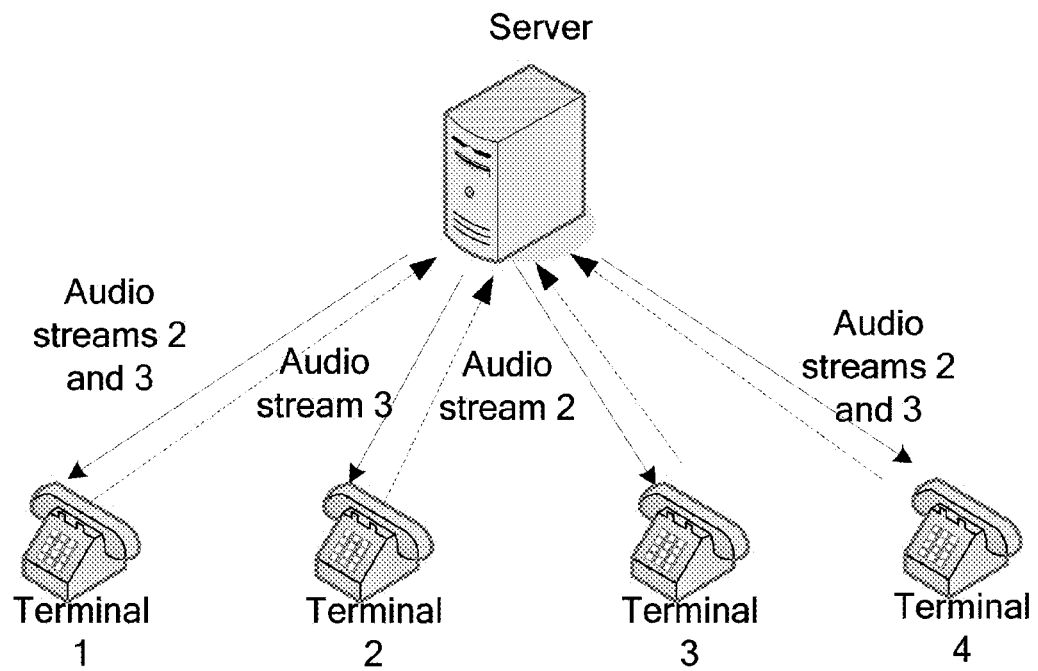
FIG. 5a illustrates a system networking structure diagram according to the second method embodiment of the present invention.

The above audio stream delivery policy will be further explained. As shown in FIG. 5*a*, there are four terminals and one server. There is one terminal at one conference site and therefore the terminal number is also the site number. The dashed lines from the terminals to the server indicate that the terminals upload the audio streams collected by themselves to the server. The continuous lines from the server to the terminals indicate that the server sends the selected audio streams to the terminals. Assume that the server finds through calculation that terminal 2 and terminal 3 are the terminals corresponding to the audio streams of the highest energy. Then, the server sends audio streams 2 and 3 to terminal 1 and terminal 4, sends audio stream 3 to terminal 2, and sends audio stream 2 to terminal 3.

Figure 5B:
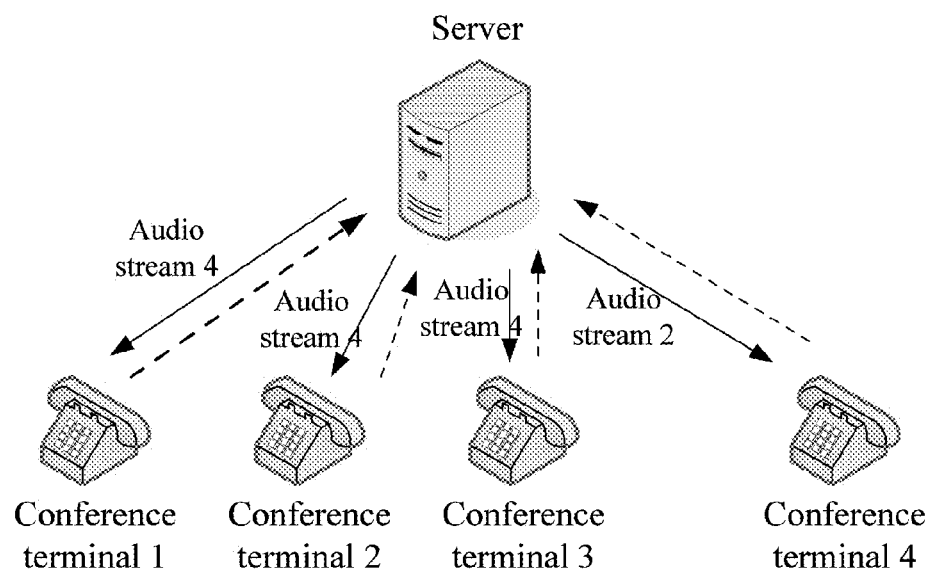
FIG. 5b illustrates another system networking structure diagram according to the second method embodiment of the present invention.

As shown in FIG. 5*b*, there are also four terminals and one server, but terminals 1, 2, and 3 are at one conference site (as indicated by the dashed rectangle in the figure) and terminal 4 is at another conference site. The meanings of the dashed and continuous lines are the same as those in FIG. 5*a*. Assume that the server finds through calculation that terminal 2 is the terminal corresponding to the audio streams of the highest energy. Then, the server sends audio stream 4 to terminal 1, terminal 2, and terminal 3, and sends audio stream 2 to terminal 4. In this example, there is more than one terminal at one conference site and therefore the terminal number is not the site number.

With the technical solution of the embodiment of the present invention, one terminal is capable of determining the sound image positions of other terminals freely according to the audio streams received from the other terminals and the identifiers allocated for the audio streams. Especially, when the audio streams carry the position information of sound sources, the terminal can determine the sound image positions of other terminals more precisely according to the position information of the sound sources.

Method Embodiment 3

The third method embodiment of the present invention is applicable in a scenario where there is a cascade of servers. The structure in the scenario is illustrated in FIG. 6.

Figure 6:
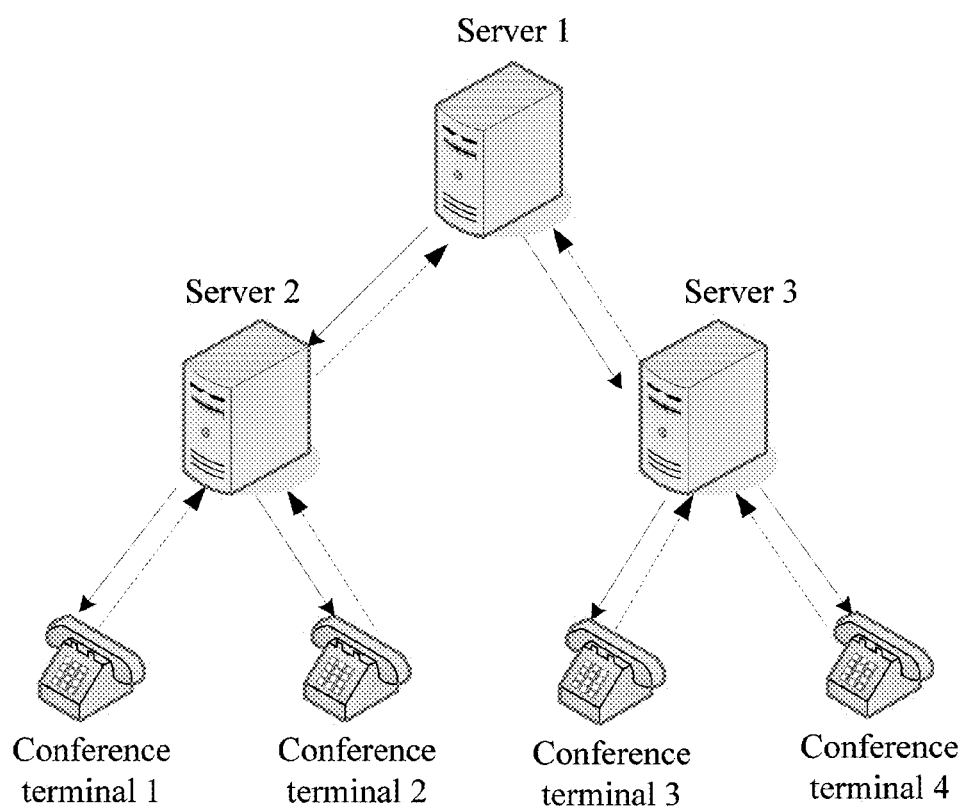
FIG. 6 illustrates a system networking structure diagram according to a third method embodiment of the present invention.

In FIG. 6, there are altogether three servers and four terminals. Terminal 1 and terminal 2 are connected to server 2; terminal 3 and terminal 4 are connected to server 3; and server 2 and server 3 are connected to server 1. Server 1 can be regarded as the master server and the servers 2 and 3 are the slave servers of server 1.

Figure 7:
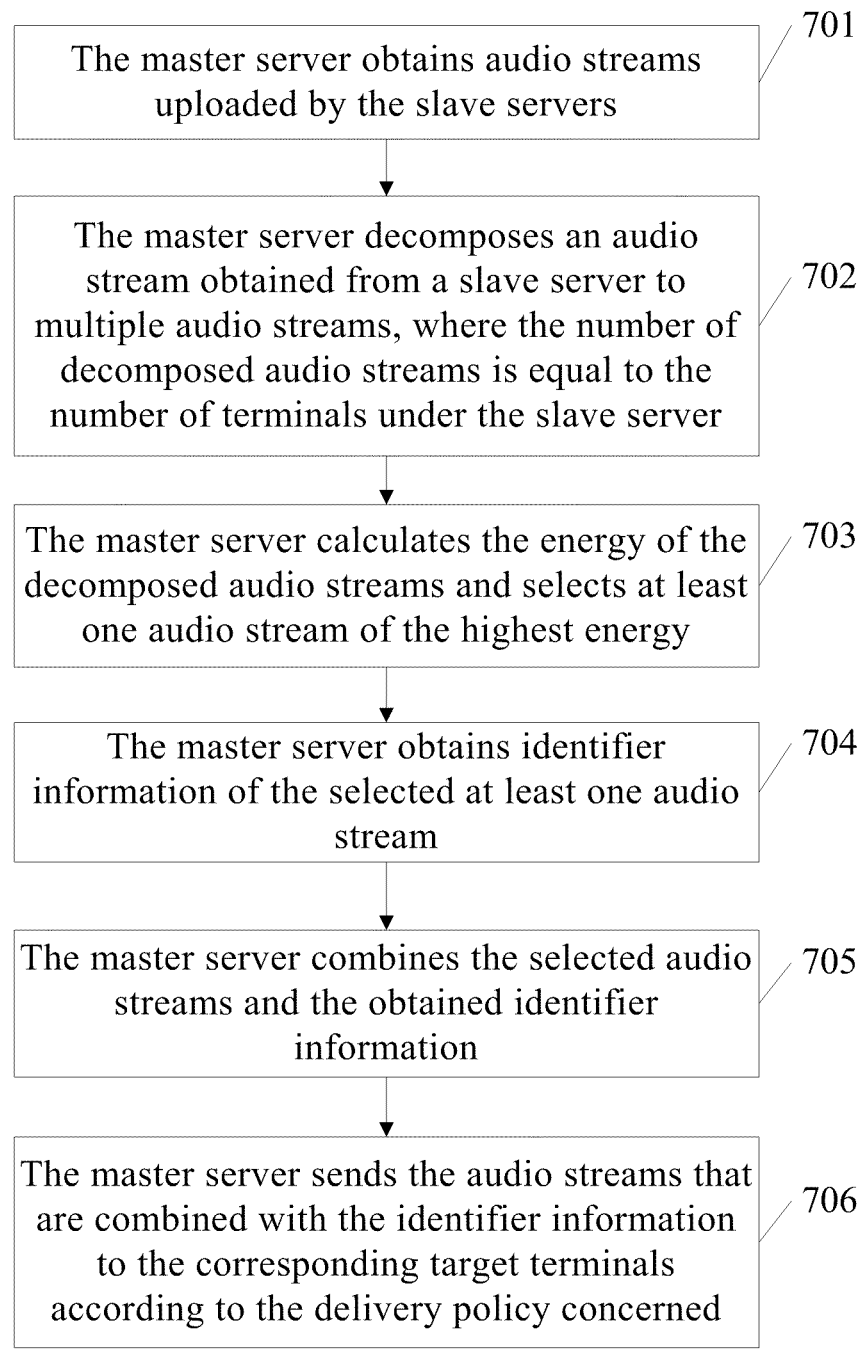
FIG. 7 illustrates a flow chart of the third method embodiment of the present invention.

In the case of a cascade of servers, the processing flow, as shown in FIG. 7, includes the following steps:

701. The master server obtains audio streams uploaded by the slave servers.

702. The master server decomposes one audio stream obtained from a slave server to multiple audio streams. The number of decomposed audio streams is equal to the number of terminals under the slave server.

In this step, because the audio stream obtained from the slave server is uploaded by the terminals under the slave server, the master server can decompose the audio stream to different audio streams depending on the terminals.

703. The master server calculates the energy of the audio streams and selects at least one audio stream of the highest energy.

The specific implementation of this step is like that of step 402 in the second method of the present invention and will not be further described here.

704. The master server obtains the identifier information of the selected at least one audio stream.

In this step, the master server obtains the identifier information of the selected at least one audio stream through the slave server. The obtainment is like that in step 403 of the second method embodiment of the present invention and will not be further described here.

705. The master server combines the selected audio stream and the obtained identifier information.

The implementation of this step is like that in step 404 of the second method embodiment of the present invention and will not be further described here.

706. The master server sends the at least one audio stream that is combined with the identifier information to the corresponding terminals according to the related delivery policy.

The implementation of this step is like that in step 405 of the second method embodiment of the present invention and will not be further described here.

It is understood that the third method embodiment of the present invention only discusses the processing in the case of a cascade of three servers. For a cascade of more servers, the implementation method can be derived from the embodiment of the present invention.

With the technical solution of the embodiment of the present invention, one terminal is capable of determining the sound image positions of other terminals freely according to the audio streams received from the other terminals and the identifiers allocated for the audio streams. Especially, when the audio streams carry the position information of sound sources, the terminal can determine the sound image positions of other terminals more precisely according to the position information of the sound sources.

Method Embodiment 4

The fourth method embodiment of the present invention is applicable to a scenario where there are at least one terminal and a cascade of servers. The structure in the scenario is illustrated in FIG. 8.

Figure 8:
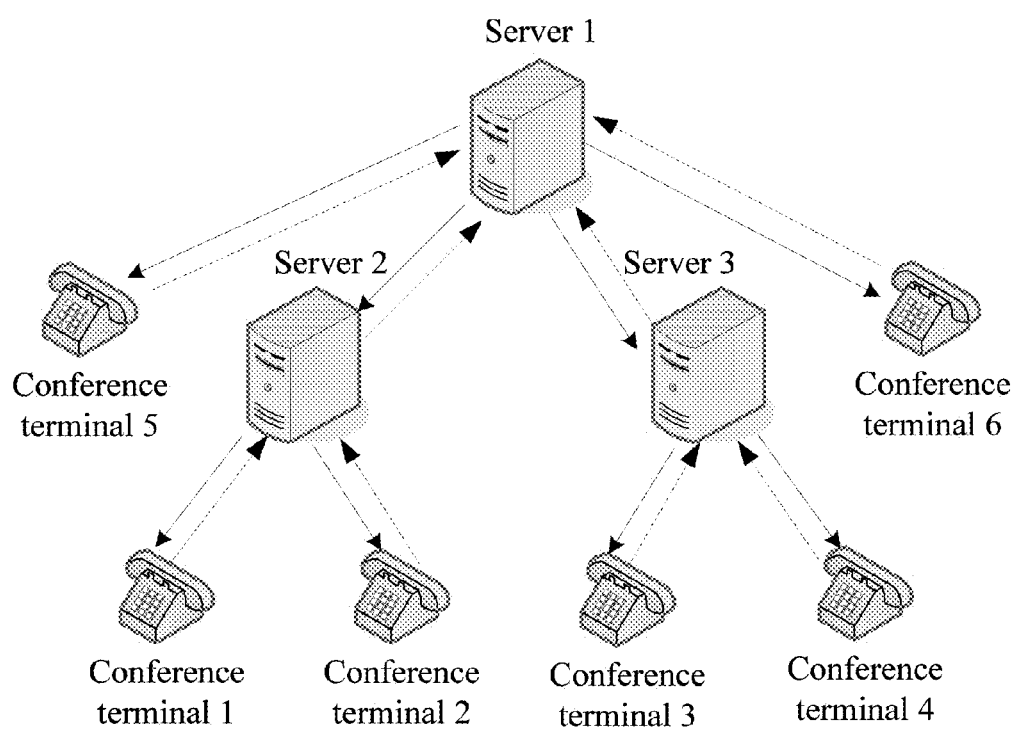
FIG. 8 illustrates a system networking structure diagram according to a fourth method embodiment of the present invention.

In FIG. 8, there are three servers, where server 1 is the master server, and server 2 and server 3 are slave servers. The three servers form a cascade. In addition, there are six terminals, where terminal 1 and terminal 2 are controlled by server 2, terminal 3 and terminal 4 are controlled by server 3, and terminal 5 and terminal 6 are connected directly to the master server (server 1).

Figure 9:
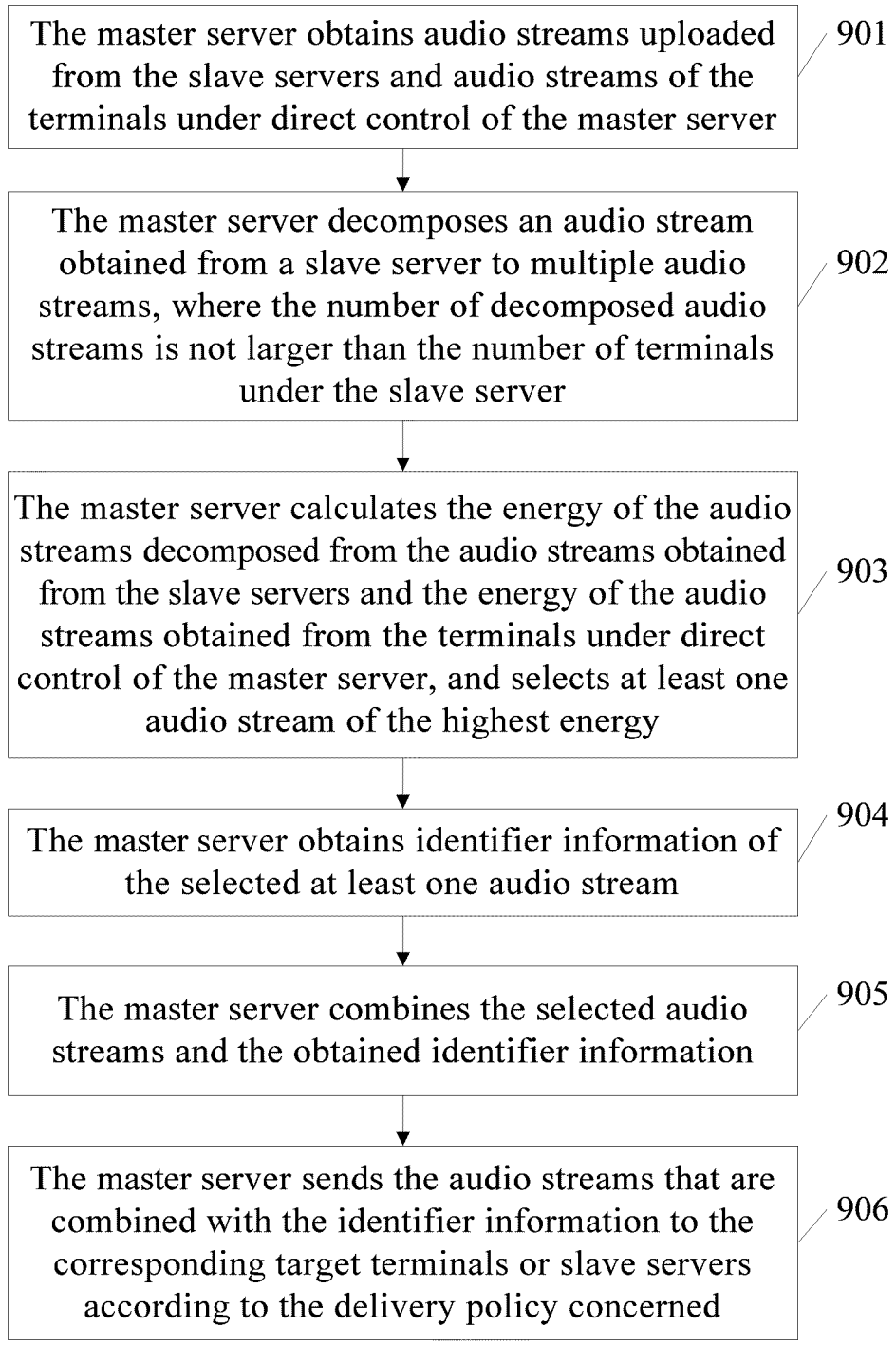
FIG. 9 illustrates a flow chart of the fourth method embodiment of the present invention.

As shown in FIG. 9, the processing flow includes the following steps:

901. The master server obtains audio streams uploaded from the slave servers and audio streams of the terminals under direct control of the master server.

902. The master server decomposes an audio stream obtained from a slave server to multiple audio streams. The number of decomposed audio streams is not larger than the number of terminals under the slave server.

In this step, because the audio stream obtained from the slave server is uploaded by the terminals under the slave server, the master server can decompose the audio stream to different audio streams depending on the terminals. The number of audio streams after decomposition may be smaller than the number of terminals under the slave server and is determined according to whether the terminals generate a sound signal, that is, when some terminals do not generate a sound signal, the number of audio streams is smaller than the number of terminals under the slave server.

903. The master server calculates the energy of the audio streams decomposed from the audio streams obtained from the slave servers and the energy of the audio streams obtained from the terminals under direct control of the master server, and selects at least one audio stream of the highest energy.

In this step, the process that the master server calculates the energy of the audio streams decomposed from the audio streams obtained from the slave servers and the energy of the audio streams obtained from the terminals under direct control of the master server, and selects at least one audio stream of the highest energy is similar to the step 402 of the second method embodiment of the present invention and therefore will not be further described here.

904. The master server obtains the identifier information of the selected at least one audio stream.

This step is similar to the step 403 of the second method embodiment of the present invention and will not be further described here.

905. The master server combines the selected at least one audio stream and the obtained identifier information.

This step is similar to the step 404 of the second method embodiment of the present invention and will not be further described here.

906. The master server sends the at least one audio stream that is combined with the identifier information to the corresponding terminals or slave servers according to the related delivery policy.

The implementation of this step is like that in step 405 of the second method embodiment of the present invention and will not be further described here.

It is understood that the fourth method embodiment of the present invention only discuss the scenario of a cascade of three servers and two terminals under direct control of the master server. The scenario of a cascade of more server and more terminals under direct control of the master server may also be derived from the embodiment of the present invention.

With the technical solution of the embodiment of the present invention, one terminal is capable of determining the sound image positions of other terminals freely according to the audio streams received from the other terminals and the identifiers allocated for the audio streams. Especially, when the audio streams carry the position information of sound sources, the terminal can determine the sound image positions of other terminals more precisely according to the position information of the sound sources.

Method Embodiment 5

Figure 10:
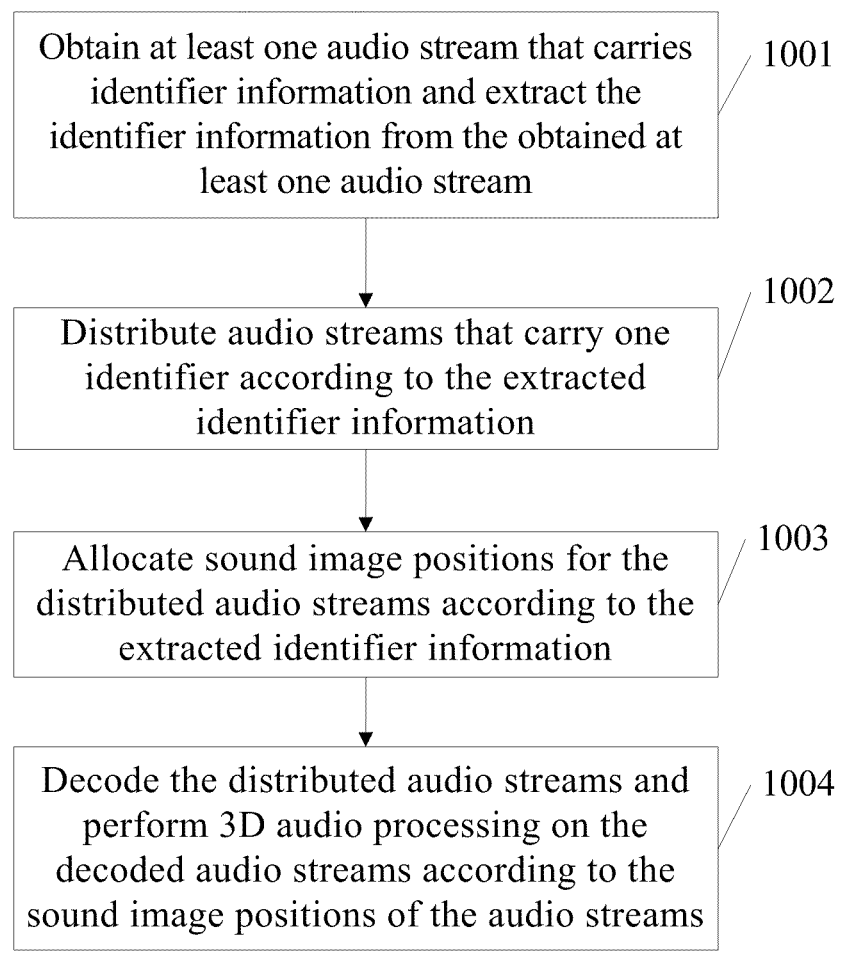
FIG. 10 illustrates a flow chart of a fifth method embodiment of the present invention.

The fifth method embodiment of the present invention is applicable to the processing of received audio streams by a terminal. As shown in FIG. 10, the processing includes the following steps:

1001. The terminal obtains at least one audio stream that carries identifier information and extracts the identifier information from the obtained at least one audio stream.

In this step, the terminal first obtains at least one audio stream that carries identifier information, for example, receiving at least one audio stream that carries identifier information sent by a server. Then, the terminal extracts the identifier information from the IP header or audio frame header of the obtained audio stream.

1002. The terminal distributes audio streams that carry the same identifier according to the extracted identifier information.

In this step, because different audio streams carry different identifier information, audio streams with the same identifier are distributed to the same decoding module.

1003. The terminal allocates sound image positions for the distributed audio streams according to the extracted identifier information.

In this step, the terminal allocates sound image positions according to the identifier information of the audio streams extracted in step 1001.

Figure 11:
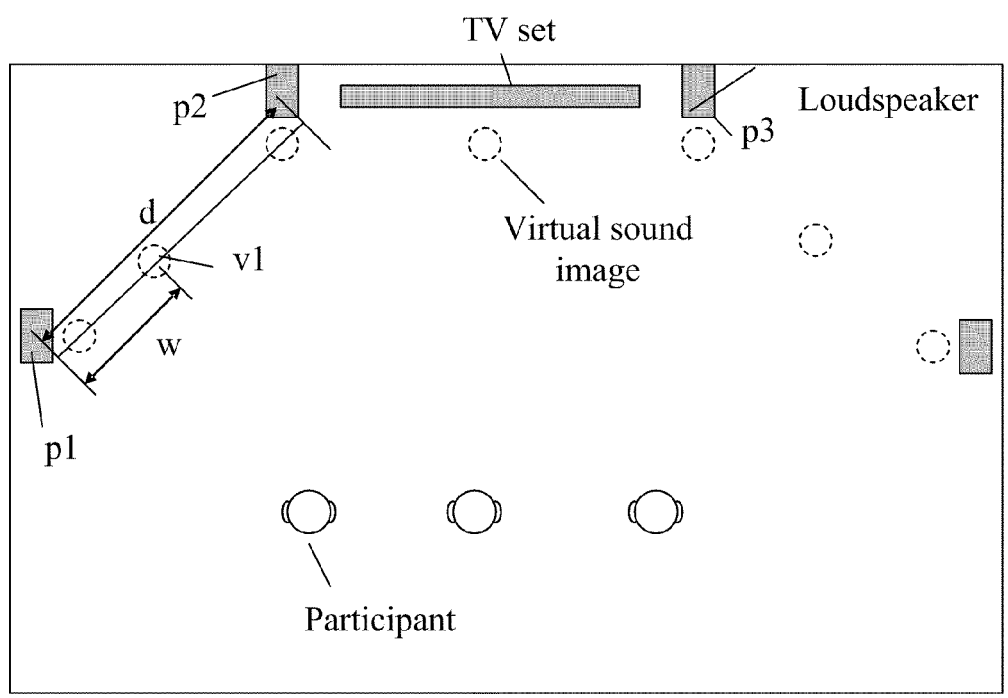
FIG. 11 illustrates a structure diagram of 3D audio processing in a method embodiment of the present invention.

The allocation of sound image positions may be implemented in advance by the user. That is, a certain sound image position is fixedly allocated for a certain terminal. Or, the allocation can be automatic according to the following rules:

When the identifier includes only the site number:

(1) If the identifier of an audio stream is consistent with the terminal being watched, the middle sound image position is allocated. As shown in FIG. 11, this position is the virtual sound image position in front of the TV set. The benefit of such allocation is that the sound image position matches the image being watched.

(2) If the audio signal energy of a terminal is high, a front sound image position is allocated so as to guarantee that the voice of the far-end speaker comes from the front.

(3) If the audio signal energy of a terminal is low, a side sound image position is allocated. Such a terminal may send only a noise, and allocating a side sound image position helps to separate the noise from the voice of the far-end speaker so that the voice of the speaker is clear.

When the identifier includes only the terminal number: If the terminal number of an audio stream is consistent with the terminal being watched, a sound image position that matches the image is allocated, that is, as shown in FIG. 11, a sound image position between the two loudspeakers in the front (p2 and p3). If the terminal number of an audio stream is not consistent with the terminal being watched, a side sound image position is allocated, that is, as shown in FIG. 11, a sound image position between loudspeakers p1 and p2.

When the identifier includes the terminal number and position information: The allocation is first performed according to the terminal number. If the terminal number of an audio stream is consistent with the terminal being watched, a sound image position that matches the image is allocated, that is, as shown in FIG. 11, a sound image position between the two loudspeakers in the front (p2 and p3). If the terminal number of an audio stream is not consistent with the terminal being watched, a side sound image position is allocated, that is, as shown in FIG. 11, a sound image position between loudspeakers p1 and p2. Because the audio stream identifier also includes the position information of the audio stream, the allocation of the sound image position according to the terminal number and the position information can be more accurate. For example, after allocation based on the terminal number is complete, if the terminal number of the audio stream is consistent with the terminal being watched and the horizontal position is in the left middle, the speaker is in a left middle position of the image. In this case, the sound image position of the audio stream can be allocated in the left middle relative to the image, that is, as shown in FIG. 11, a left middle position between the two front loudspeakers p2 and p3.

1004. The terminal decodes the distributed audio streams and performs 3D audio processing on the decoded audio streams.

In this step, the terminal decodes the audio streams that are distributed in one audio stream according to the same identifier information in step 1002 and performs 3D audio processing on the decoded audio streams according to the sound image position allocated in step 1003.

3D audio processing is used in all method embodiments of the present invention, which will not be described elsewhere. The purpose of 3D audio processing is to create a stereo acoustic field through the two loudspeakers on the left and the right. The specific processing will be explained through the following example with reference to FIG. 11.

In FIG. 11, the distance between loudspeakers p1 and p2 is d and the distance from the virtual sound image v1 to loudspeaker p1 is w. Assume that the sound image position allocated for audio stream s1 is v1. Then s1 can be multiplied by the gain g1 and sent to p1, and s1 can be multiplied by the gain g2 and sent to p2. The gains g1 and g2 can be calculated as follows:

$$w/d = (g1-g2)/(g1+g2) \quad (1)$$

$$c = g1 \times g1 + g2 \times g2 \quad (2)$$

In (1) and (2), g1 is the amplitude gain on the left sound channel, g2 is the amplitude gain on the right sound channel, and c is a constant, for example, 1.

After the gains on the left and right sound channels are calculated, a stereo acoustic field can be simulated.

The technical solution of the embodiment of the present invention enables a terminal to determine the sound image positions of other terminals freely according to the audio streams received from the terminals and the identifiers of the audio streams so as to separate the mixed audio signals of different sound sources, and calculate the positions of the audio signals from different sound sources so that the receiving terminal can simulate and reproduce the original acoustic field after the audio signals are outputted.

Method Embodiment 6

Figure 12:
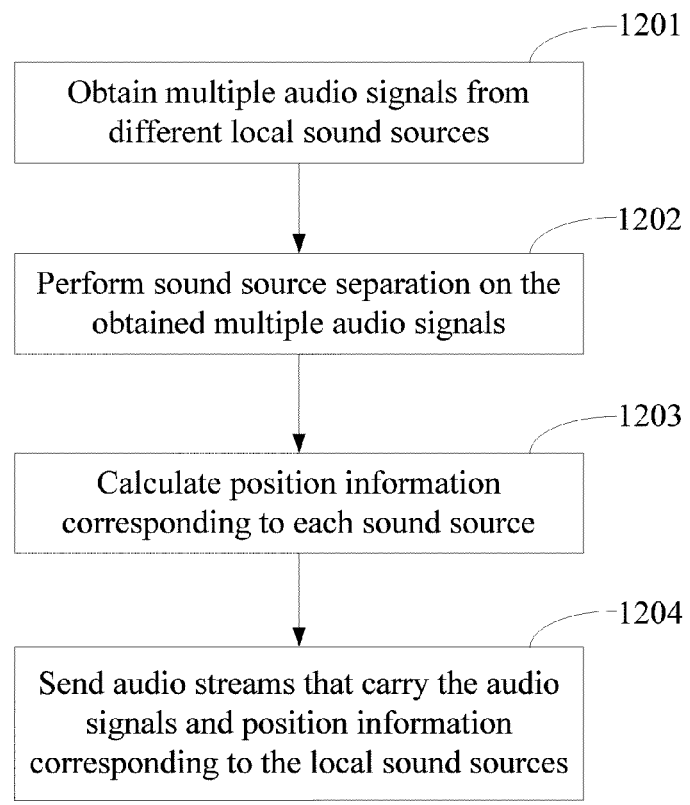
FIG. 12 illustrates a flow chart of a sixth method embodiment of the present invention.

This embodiment provides a method for obtaining the position information of a sound source corresponding to the audio signal in an audio stream. FIG. 12 is a flowchart of the method for obtaining the position information of a sound source corresponding to the audio signal in an audio stream according to the embodiment of the present invention. The flowchart includes the following steps:

1201. The terminal obtains multiple audio signals from local sound sources.

In this step, the obtaining of audio signals from local sound sources is collecting the voice signals of multiple local speakers (multiple sound sources) that talk simultaneously through a microphone array so as to capture multiple sound signals which are converted to multiple audio signals. The local position may be the local conference site where the microphone array is located.

1202. The terminal performs sound source separation on the obtained multiple audio signals to obtain the audio signal corresponding to each sound source.

In this step, a blind source separation method is used to separate the obtained multiple audio signals.

Figure 13:
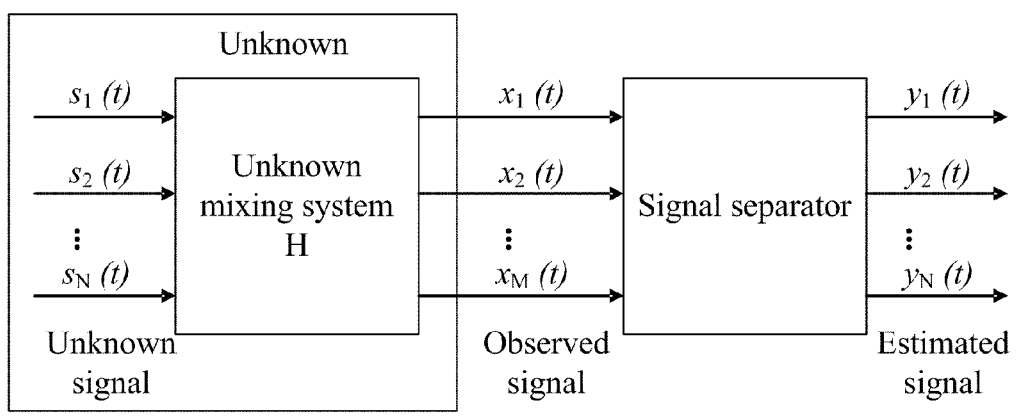
FIG. 13 is a schematic diagram of a blind source separation method in the sixth method embodiment of the present invention.

The blind source separation method is explained as follows:

FIG. 13 is the schematic diagram of the blind source separation method shown in FIG. 12. Blind source separation is the restoration or separation of a set of signals from a set of observed mixed signals according to the statistic characteristics of the input signals, without the aid of information about the source signals or the transmission channels. This means that the source signals are invisible and that the observed signals are the mixed signals. The mixing process of the source signals is also unknown. Typical observed signals are the outputs of a set of sensors, while the signals received by each sensor are different combinations of source signals. The main task of blind source separation is to separate the source signals from the observed signals. In the embodiment of the present invention, the microphone array collects the voice signals of multiple speakers that talk simultaneously so as to obtain multiple voice streams. Blind source separation is used to restore the voice signal of each speaker from the multiple voice streams, that is, to separate the audio signals corresponding to multiple sound sources from multiple voice streams. The basic principle of blind source separation is the restoration or separation of source signals after the observed signals pass through a separation system. As shown in FIG. 13, N mutually statistically independent unknown source signals $s=[s1(t), s2(t), \ldots, sN(t)]T$ are transmitted by the unknown mixing system H and then detected by M sensors to obtain M observed signals $x=[x1(t), x2(t), \ldots, xM(t)]T$. The task of blind source separation is to make the output signal y=[y1(t), y2(t), ..., yN(t)]T a copy or estimation of the source signal after the observed signal passes through a signal separator (that is, a separation algorithm).

Currently, there are three main blind source separation methods: independent component analysis, entropy maximization, and nonlinear principal component analysis.

1203. The terminal calculates the positions of the sound sources according to the obtained multiple audio signals and the position relations between the apparatuses used to obtain the multiple audio signals from different sound sources.

In this step, calculating the positions of the sound sources according to the obtained multiple audio signals and the position relations between the apparatuses used to obtain the multiple audio signals from different sound sources includes: estimating relative delays between the arrival of the multiple audio signals at the apparatuses used to obtain the multiple audio signals from different sound sources; and calculating the positions of the sound sources according to the estimated relative delays and the position relations between the apparatuses used to obtain the multiple audio signals from different sound sources.

The following describes the sound source positioning algorithm based on delay estimation.

Figure 14:
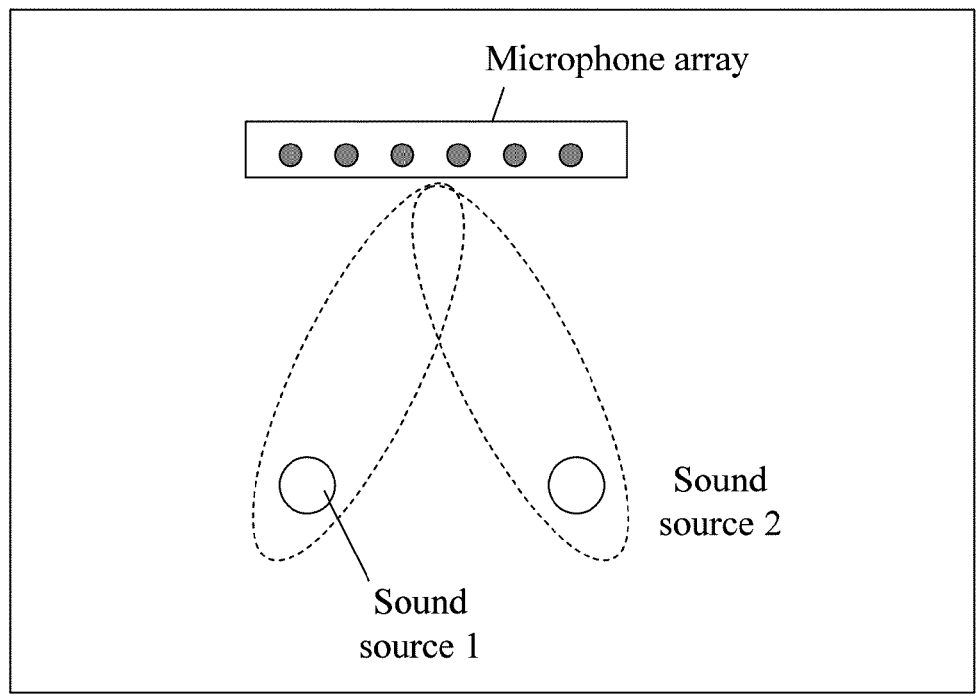
FIG. 14 illustrates how a microphone array captures sound signals in the sixth method embodiment of the present invention.

FIG. 14 illustrates how the microphone array shown in FIG. 12 captures sound signals. As shown in FIG. 14, because the distances between a sound source and different microphones vary, the time when the sound signal from the sound source reaches different microphones in the microphone array is different. Assume there are two sound sources. The sound signal from source 1 reaches different microphones in the microphone array at different time points; the sound signal from source 2 also reaches different microphones in the microphone array at different time points. Thus, the time when the microphones output the audio signals corresponding to one sound source is also different. Therefore, the relative delays between the audio signals corresponding to each sound source are first estimated and then the position of the sound source is determined according to the estimated relative delays and the already known position relations between the microphones. The delay estimation algorithm in widest use is Generalized Cross Correlation (GCC). GCC calculates the cross power spectrum between two audio signals, and weights the signals in the frequency domain to suppress noises and reflected sounds, performs inverse transform to the time domain to obtain the correlation function between the two audio signals. The peak position of the correlation function is the relative delay between the two audio signals. After the relative time delay between the audio signals is obtained, the position of the sound source can be obtained with reference to the known position relations between the microphones.

1204. The terminal sends audio streams that carry the audio signals and position information corresponding to the local sound sources.

Here, the position information may be included in the RTP header of the audio stream and thereby the audio stream that carries the position information is sent. A flag can be set in an appropriate header field to indicate that the position information is included in the header to help the server inspect the position information in the header according to the flag when receiving the audio stream. Alternatively, the field value can be set to 0 or 1 to indicate whether the header carries the position information. Those skilled in the art can set the header according to common technical knowledge so that the server inspects the position information in the header after receiving the audio stream.

It should be noted that the method provided in the embodiment of the present invention is intended to obtain the position information of sound sources and does not conflict with the 3D audio processing in the previous embodiment of the present invention. The method in this embodiment of the present invention may be implemented before 3D audio processing, for example, obtaining the position information of sound sources at the site where the microphone array is located before step 1001 in the fifth method embodiment of the present invention, which indicates that the peer end is receiving audios of the local end. Alternatively, this may be implemented after the 3D audio processing in the fifth method embodiment of the present invention, which indicates that the local end is answering the peer end. The obtainment of the position information is implemented mainly on the basis of the condition of sound sources at the site where the microphone array is located. Thus, it can be inferred that the method provided in the sixth embodiment can coexist with the method provided in the fifth embodiment completely. For example, they can be designed on one terminal so that both the methods are implemented.

The method provided in the sixth embodiment enables the terminal to obtain the position information of a sound source and carry the position information in the header of an audio stream for transmission, so that the server can allocate the identifier of the audio stream according to the position information in the audio stream.

SYSTEM EMBODIMENTS

System Embodiment 1

Figure 15:
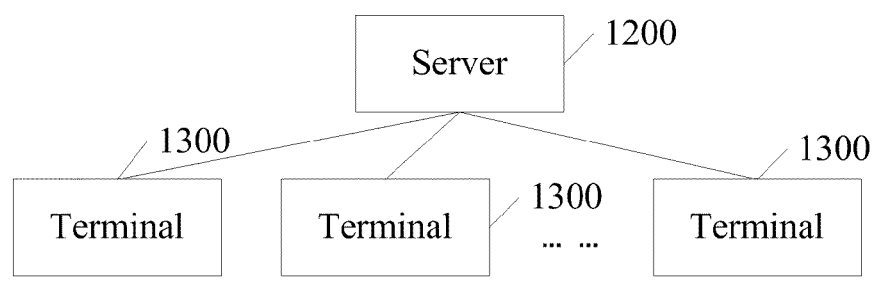
FIG. 15 illustrates a structure diagram of a first system embodiment of the present invention.

The first system embodiment of the present invention is illustrated in FIG. 15. The system includes:
- a server 1200, adapted to: obtain at least one audio stream relative to one terminal; allocate identifiers for the obtained at least one audio stream relative to the terminal; and combine the obtained at least one audio stream relative to the terminal and the identifiers of the at least one audio stream and send the combination to the target terminal; and
- at least one target terminal 1300, adapted to: obtain the at least one audio stream that carries identifier information, extract the identifiers of the audio streams, distribute audio streams that carry a same identifier, and allocate sound image positions for the distributed audio streams according to the extracted identifier information; and decode the distributed audio streams and perform 3D audio processing on the distributed audio streams according to the sound image positions of the audio streams.

The target terminal 1300 is further adapted to: obtain multiple audio signals from sound sources at the conference site where the terminal is located; perform source separation on the obtained multiple audio signals to obtain the audio signal corresponding to each sound source; calculate the position information corresponding to each sound source according to the obtained multiple audio signals and position relations between the apparatuses used to obtain the multiple audio signals from the sound sources; and send to the server audio streams that include the audio signals and position information corresponding to the sound sources.

With the technical solution provided by the embodiment of the present invention, one terminal is capable of determining the sound image positions of other terminals according to the audio streams received from the other terminals and the identifiers allocated for the audio streams.

System Embodiment 2

The structure of the system provided according to the second embodiment is illustrated in FIG. 6. On the basis of the first system embodiment of the present invention, the system in the second embodiment includes a master server, namely, server 1 in FIG. 6, and at least one slave server, namely, server 2 and server 3 in FIG. 6. The master server is adapted to: obtain at least one audio stream relative to one terminal; allocate identifiers for the obtained at least one audio stream relative to the terminal; combine the obtained at least one audio stream relative to the terminal and the identifiers of the at least one audio stream, and send the combination to the terminal. The master server is further adapted to decompose an audio stream that is combined by the at least one slave server with an identifier to multiple audio streams. The at least one slave server is adapted to obtain audio streams from terminals under its control or other servers and combine the obtained audio streams with the identifiers of the audio streams.

With the technical solution provided by the embodiment of the present invention, one terminal is capable of determining the sound image positions of other terminals according to the audio streams received from the other terminals and the identifiers allocated for the audio streams.

APPARATUS EMBODIMENT

Server Embodiment

Figure 16:
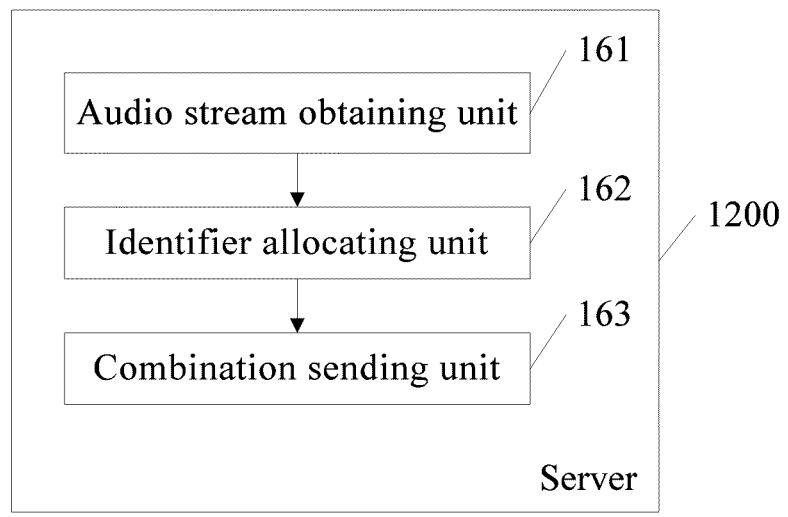
FIG. 16 illustrates a structure diagram of a first server embodiment of the present invention.

This embodiment provides a signal processing server for 3D audio conferencing. As shown in FIG. 16, the server includes:
an audio stream obtaining unit 161, adapted to obtain at least one audio stream relative to one terminal;
an identifier allocating unit 162, adapted to allocate identifiers for the obtained at least one audio stream relative to the terminal; and
a combination sending unit 163, adapted to combine the obtained at least one audio stream relative to the terminal and the identifiers of the at least one audio stream and send the combination to the terminal.

Figure 17:
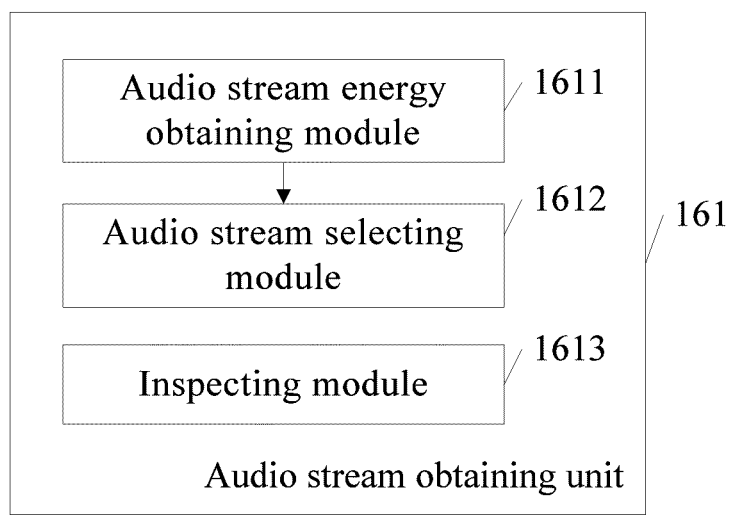
FIG. 17 illustrates a structure diagram of an audio stream obtaining unit in the first server embodiment of the present invention.
Figure 18:
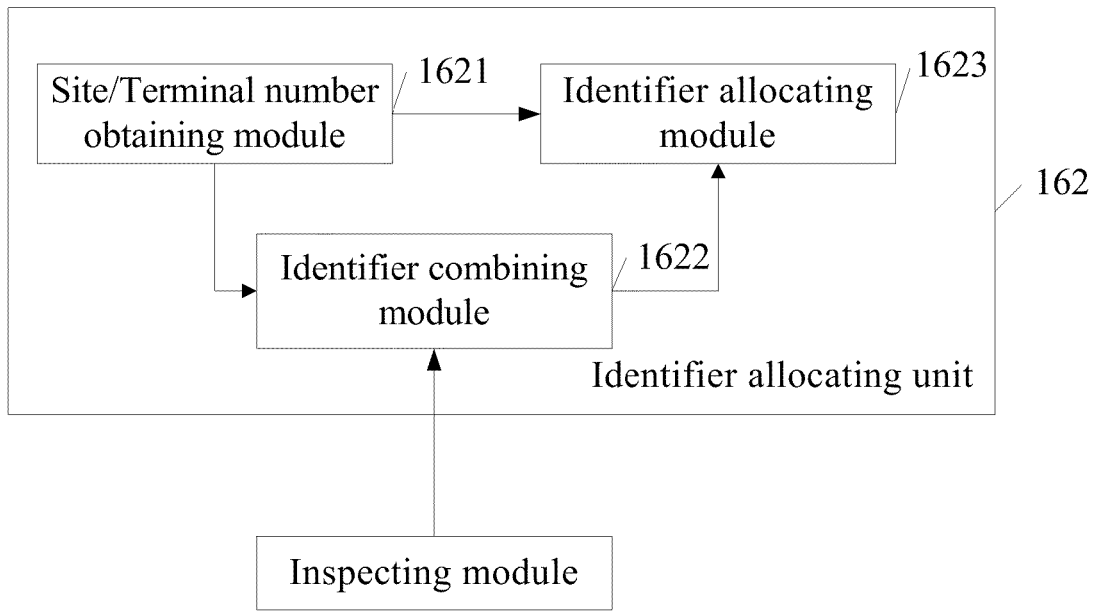
FIG. 18 illustrates a structure diagram of an identifier allocating unit shown in FIG. 16.

As shown in FIG. 17, the audio stream obtaining unit 161 includes:
an audio stream energy obtaining module 1611, adapted to obtain energy of multiple audio streams relative to the terminal; and
an audio stream selecting module 1612, adapted to select at least one audio stream of the highest energy according to the obtained energy of the multiple audio streams.

The audio stream obtaining unit 161 may further include:
an inspecting module 1613, adapted to inspect the packet header of the obtained audio stream for the position information of the sound source corresponding to the audio signal.

As shown in FIG. 8, the identifier allocating unit 162 may include:
a site/terminal number obtaining module 1621, adapted to obtain the site number of the conference site where the at least one audio stream of the highest energy is generated and/or the terminal number of the at least one audio stream of the highest energy;
an identifier combining module 1622, adapted to combine the position information inspected by the inspecting module 1613 with the site number or terminal number obtained by the site/terminal number obtaining module 1621 into a second identifier; and
an identifier allocating module 1623, adapted to allocate the site number or terminal number obtained by the site/terminal number obtaining module 1621 for the audio stream as a first identifier and adapted to allocate the second identifier combined by the identifier combining module 1622 for the audio stream.

Figure 19:
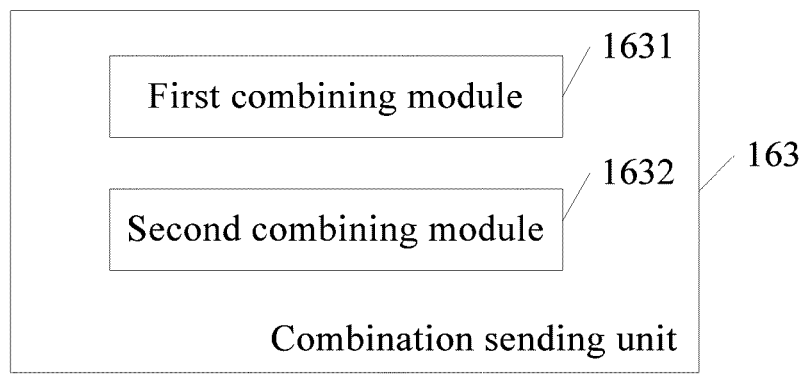
FIG. 19 illustrates a structure diagram of a combination sending unit in the first server embodiment of the present invention shown in FIG. 16.

As shown in FIG. 19, the combination sending unit 163 includes: a first combining module 1631, adapted to add the identifiers allocated for the at least one audio stream in protocol headers when encapsulating each audio frame without any change to the selected audio streams; and/or a second combining module 1632, adapted to: encode/decode the selected single-channel audio streams and combine the encoded/decoded single-channel audio streams into one multi-channel stream and add the identifiers allocated for the at least one audio stream corresponding to multiple sound channels in the frame header of the multi-channel stream.

With the technical solution of the embodiment of the present invention, one terminal is capable of determining the sound image positions of other terminals freely according to the audio streams received from the other terminals and the identifiers allocated for the audio streams. Especially, when the audio streams carry the position information of sound sources, the terminal can determine the sound image positions of other terminals more precisely according to the position information of the sound sources.

DEVICE EMBODIMENTS

Device Embodiment 1

Figure 20:
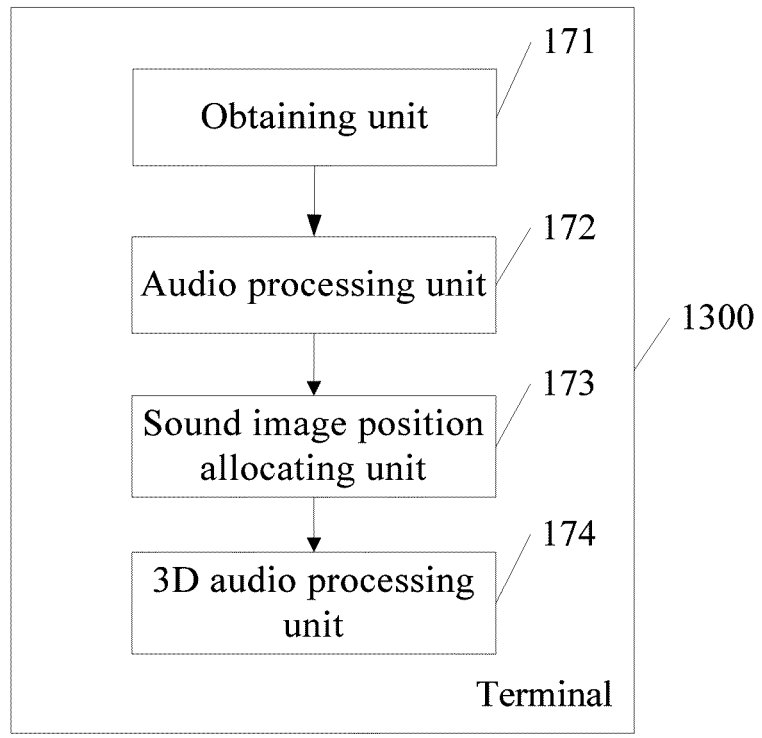
FIG. 20 illustrates a structure diagram of a first device embodiment of the present invention.

This embodiment provides a signal processing terminal for 3D audio conferencing. As shown in FIG. 20, the terminal includes:
an obtaining unit 171, adapted to obtain at least one audio stream that carries identifier information;
an audio processing unit 172, adapted to: extract the identifier information of the at least one audio stream obtained by the obtaining unit 171, distribute the audio streams according to the identifier information, and decode the audio streams;
a sound image position allocating unit 173, adapted to allocate sound image positions for the decoded multiple audio streams according to the identifier information extracted by the audio processing unit 172; and adapted to allocate accurate sound image positions according to position information when the identifier information includes the position information of the corresponding sound source; and
a 3D audio processing unit 174, adapted to perform 3D audio processing on the decoded multiple audio streams according to the allocated sound image positions.

Figure 21:
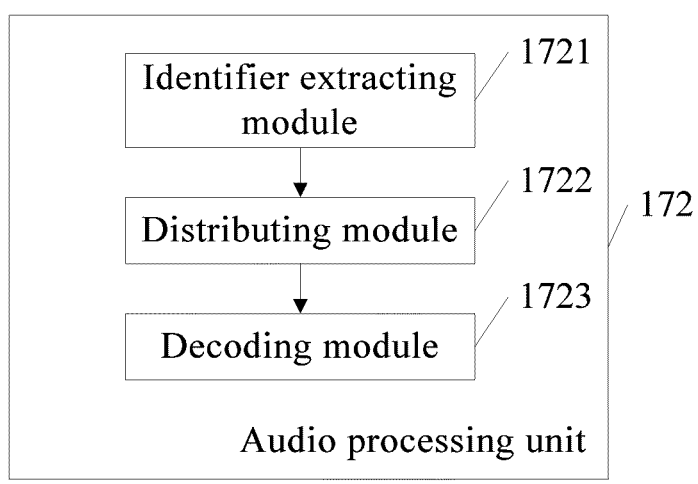
FIG. 21 illustrates a structure diagram of an audio processing unit in the first device embodiment of the present invention shown in FIG. 20.

As shown in FIG. 21, the audio processing unit 172 includes: an identifier extracting module 1721, adapted to extract identifier information from the obtained multiple audio streams for which identifiers are allocated; a distributing module 1722, adapted to distribute the audio streams according to the extracted identifier information; and a decoding module 1723, adapted to decode the multiple audio streams respectively.

With the technical solution of the embodiment of the present invention, one terminal is capable of determining the sound image positions of other terminals freely according to the audio streams received from the other terminals and the identifiers allocated for the audio streams. Especially, when the audio streams carry the position information of sound sources, the terminal can determine the sound image positions of other terminals more precisely according to the position information and thereby, the terminal can perform 3D audio processing on the decoded audio streams according to the allocated sound image positions.

Device Embodiment 2

Figure 22:
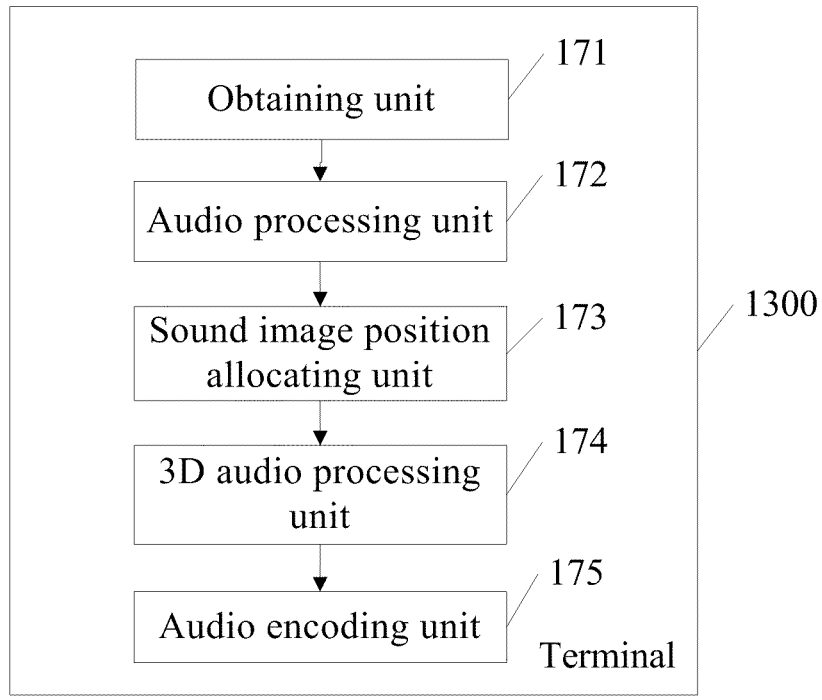
FIG. 22 illustrates a structure diagram of a second device embodiment of the present invention.

On the basis of the first device embodiment, as shown in FIG. 22, the terminal further includes: an audio encoding unit 175, adapted to encode the obtained audio signals.

Device Embodiment 3

Figure 23:
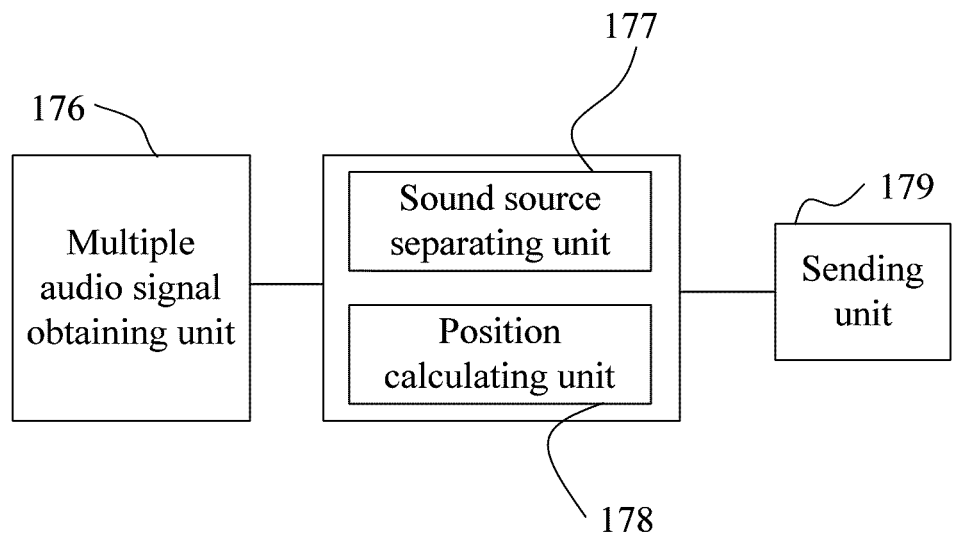
FIG. 23 illustrates a structure diagram of a third device embodiment of the present invention.

As shown in FIG. 23, on the basis of the first and second device embodiments, the terminal further includes: a multiple audio signal obtaining unit 176, adapted to obtain multiple audio signals from local sound sources before the terminal receives the multiple audio streams sent by the server or after the terminal performs 3D audio processing on the received multiple audio streams; a sound source separating unit 177, adapted to perform sound source separation on the obtained multiple audio signals to obtain audio signals corresponding to the sound sources; a position calculating unit 178, adapted to calculate the position information corresponding to the sound sources according to the obtained multiple audio signals and the position relations between apparatuses used to obtain the multiple audio signals from the sound sources; and a sending unit 179, adapted to send audio streams that carry the audio signals and position information corresponding to the sound sources.

Figure 24:
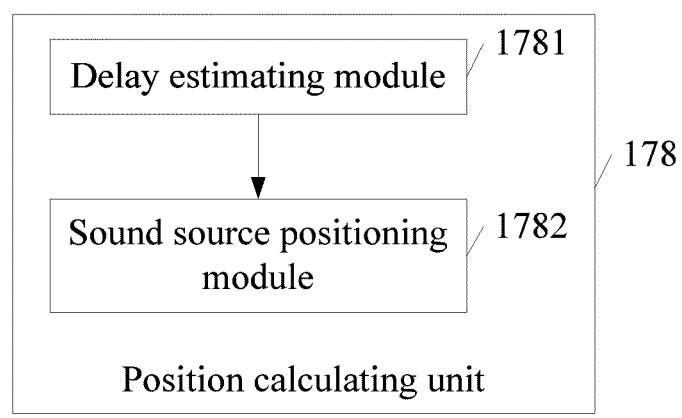
FIG. 24 illustrates a structure diagram of a position calculating unit shown in FIG. 23.

As shown in FIG. 24, the position calculating unit 178 may include: a delay estimating module 1781, adapted to estimate the relative delays between the arrival of the multiple audio signals at the apparatuses used to obtain the multiple audio signals from the sound sources; a sound source positioning module 1782, adapted to calculate the position information corresponding to the sound sources according to the relative delays estimated by the delay estimating module 1782 and the position relations between the apparatuses used to obtain the multiple audio signals from the sound sources.

The technical solution of the embodiment of the present invention enables a terminal to determine the sound image positions of other terminals freely according to the audio streams received from the terminals and the identifiers allocated for the audio streams, and to separate the mixed audio signals of different sound sources and calculate the positions of the audio signals from different sound sources, so that the receiving terminal can simulate and reproduce the original acoustic field after the audio signals are outputted.

The method or steps of the method provided in the embodiments disclosed herein can be implemented by using hardware, or a software module executed by a processor, or the combination of both. The software module may be placed in a random access memory (RAM), a memory, a read-only memory (ROM), an electrically programmable ROM, an electrically erasable programmable ROM, a register, a hard disk, a removable disk, a CD-ROM, or any other form of storage medium known in the art.

Although the purpose, technical solution and benefits of the present invention have been described in detail through exemplary embodiments, the invention is not limited to such embodiments. It is apparent that those skilled in the art can make various modifications and variations the invention without departing from the spirit and scope of the present invention. The invention is intended to cover the modifications and variations provided that they fall within the scope of protection defined by the claims or their equivalents.

What is claimed is:

1. A signal processing method for 3-dimensional (3D) audio conferencing, comprising:
   obtaining, by a server, more than one audio streams relative to at least one terminal;
   selecting, by the server, at least one audio stream of the more than one audio streams corresponding to a determination of at least one audio stream of highest energy;
   allocating, by the server, identifiers for the at least one audio stream of highest energy relative to at least one terminal corresponding to the at least one audio stream of highest energy, the identifiers carry position information of sound sources corresponding to audio signals for the at least one audio stream of highest energy; and
   by the server, combining only the selected at least one audio stream of highest energy relative to the at least one terminal corresponding to the at least one audio stream of highest energy and the identifiers; and
   sending the combination to a target terminal.

2. The method of claim 1, further comprising:
   combining, by the server, a terminal indicator corresponding to the at least one terminal with the position information of the sound sources corresponding to the audio signals of the at least one audio stream of highest energy to obtain the identifiers;
   wherein the more than one audio streams carry position information of sound sources corresponding to audio signals.

3. The method of claim 2, wherein the step of allocating identifiers for the obtained at least one audio stream of highest energy relative to the at least one terminal corresponding to the at least one audio stream of highest energy comprises:
   by the server, combining the position information and a terminal number into a first identifier and allocating the first identifier for the at least one audio stream of highest energy among the obtained more than one audio streams; or
   by the server, combining the position information and a site number into a second identifier and allocating the second identifier for the at least one audio stream of highest energy among the obtained more than one audio streams; or
   allocating, by the server, a terminal number or a site number as a third identifier for the at least one audio stream of highest energy among the obtained more than one audio streams.

4. The method of claim 2, wherein the step of combining only the selected at least one audio stream of highest energy relative to the at least one terminal corresponding to the at least one audio stream of highest energy and the identifiers and sending the combination to the target terminal is implemented through at least one of:
   loose combination, wherein the server makes no change to the obtained more than one audio streams and adds the identifiers allocated for the at least one audio stream of highest energy in packet headers of audio data frames when encapsulating the audio data frames; and
   tight combination, wherein the obtained more than one audio streams are single-channel audio streams and the server encodes/decodes the obtained single-channel audio streams, combines the encoded/decoded single-channel audio streams into one multi-channel stream, and adds the identifiers allocated for the at least one audio stream of highest energy corresponding to multiple channels in frame headers of the multi-channel stream.

5. The method of claim 2, wherein the step of obtaining the more than one audio streams relative to the at least one terminal is implemented in one of the following approaches:
in the case of one server, the server selects the at least one audio stream of highest energy among audio streams sent by each of multiple terminals;
in the case of a cascade of servers, a master server in the cascade selects the at least one audio stream of highest energy among multiple audio streams obtained by multiple slave servers of the master server, wherein the audio streams selected by each slave server are audio streams sent by multiple terminals under the slave server; and
in the case of at least one terminal and a cascade of servers, a master server in the cascade obtains audio streams sent by the at least one terminal and multiple audio streams obtained by multiple slave servers of the master server, wherein the audio streams obtained by each slave server are audio streams sent by multiple terminals under the slave server, and the master server the at least one audio stream of highest energy among the audio streams sent by the at least one terminal and the multiple audio streams obtained by the slave servers.

6. A signal processing server for 3-dimensional (3D) audio conferencing, comprising:
an audio stream obtaining unit, adapted to obtain more than one audio streams relative to at least one terminal and select at least one audio stream of the more than one audio streams corresponding to a determination of at least one audio stream of highest energy;
an identifier allocating unit, adapted to allocate identifiers for only the selected at least one audio stream of highest energy relative to at least one terminal corresponding to the at least one audio stream of highest energy, the identifiers carry position information of sound sources corresponding to audio signals for the at least one audio stream of highest; and
a combination sending unit, adapted to combine the selected at least one audio stream of highest energy relative to the at least one terminal corresponding to the at least one audio stream of highest energy and the identifiers and send the combination to a target terminal.

7. The server of claim 6, wherein the audio stream obtaining unit comprises:
an inspecting module, adapted to inspect packet headers of the obtained more than one audio streams for position information of sound sources corresponding to audio signals.

8. The server of claim 7, wherein the identifier allocating unit comprises:
a site/terminal number obtaining module, adapted to obtain a site number of a conference site where the at least one audio stream of highest energy is generated and/or a terminal number of a terminal that sends the at least one audio stream of the highest energy; and
an identifier allocating module, adapted to allocate the site number or terminal number obtained by the site/terminal number obtaining module for the at least one audio stream of highest energy as a first identifier.

9. The server of claim 8, wherein:
the identifier allocating unit further comprises:
an identifier combining module, adapted to combine the position information inspected by the inspecting module with the site number or terminal number obtained by the site/terminal number obtaining module into a second identifier; and
the identifier allocating module is further adapted to allocate the second identifier combined by the identifier combining module for the at least one audio stream of highest energy.

10. The server of claim 8, wherein the obtained more than one audio streams are single-channel audio streams and the combination sending unit comprises at least one of:
a first combining module, adapted to: make no change to the obtained audio streams and add the identifiers allocated for the at least one audio stream of highest energy in packet headers of audio data frames when encapsulating the audio data frames; and
a second combining module, adapted to: encode/decode the obtained single-channel audio streams, combine the encoded/decoded single-channel audio streams into one multi-channel stream, and add the identifiers allocated for the at least one audio stream of highest energy corresponding to multiple channels in frame headers of the multi-channel stream.

11. A signal processing method for 3-dimensional (3D) audio conferencing at a terminal adapted to play audio content from the 3D audio conferencing, comprising:
obtaining, by the terminal, at least one audio stream that carries identifier information and extracting the identifier information from the obtained at least one audio stream;
distributing, by the terminal, audio streams that carry a same identifier according to the extracted identifier information;
allocating, by the terminal, sound image positions for the distributed audio streams according to the extracted identifier information; and
decoding by the terminal the distributed audio streams and performing 3D audio processing on the decoded audio streams according to the sound image positions of the audio streams.

12. The method of claim 11, wherein the step of distributing, by the terminal, the audio streams that carry the same identifier according to the extracted identifier information comprises:
obtaining identifier information in an audio stream; and
distributing the audio stream to a channel of audio streams that have the same identifier information according to the obtained identifier information.

13. The method of claim 11, before obtaining by the terminal the audio streams or after performing 3D audio processing, further comprising:
obtaining multiple audio signals from different local sound sources;
performing_sound source separation on the obtained multiple audio signals to obtain an audio signal corresponding to each sound source;
calculating position information of the sound sources according to the obtained multiple audio signals and position relations between apparatuses used to obtain the multiple audio signals from different sound sources; and
sending audio streams that carry the audio signals and position information corresponding to the local sound sources.

14. The method of claim 13, wherein the step of calculating the position information of the sound sources according to the obtained multiple audio signals and position relations between apparatuses used to obtain the multiple audio signals from different sound sources comprises:
  estimating relative delays between arrival of the multiple audio signal at the apparatuses used to obtain the multiple audio signals from the sound sources; and
  calculating the position information of the sound sources according to the estimated relative delays and position relations between the apparatuses used to obtain the multiple audio signals from different sound sources.

15. A signal processing terminal adapted to play audio content for 3-dimensional (3D) audio conferencing, comprising:
  an obtaining unit, adapted to obtain at least one audio stream that carries identifier information;
  an audio processing unit, adapted to: extract the identifier information of the at least one audio stream obtained by the obtaining unit, distribute audio streams according to the identifier information, and decode the audio streams;
  a sound image position allocating unit, adapted to allocate sound image positions for the decoded audio streams according to the identifier information extracted by the audio processing unit; and
  a 3D audio processing unit, adapted to perform 3D audio processing on the decoded audio streams according to the allocated sound image positions.

16. The terminal of claim 15, wherein the audio processing unit comprises:
  an identifier extracting module, adapted to extract identifier information from the audio streams obtained by the obtaining unit;
  a distributing module, adapted to distribute the audio streams according to the extracted identifier information; and
  a decoding module, adapted to decode the audio streams respectively.

17. The terminal of claim 16, further comprising:
  an audio encoding unit, adapted to encode the obtained audio signals.

18. The terminal of claim 17, further comprising:
  a multiple audio signal obtaining unit, adapted to obtain multiple audio signals from local sound sources before the terminal obtains the audio streams sent by a server or after the terminal performs 3D audio processing on the obtained audio streams;
  a sound source separating unit, adapted to perform sound source separation on the obtained multiple audio signals and obtain an audio signal corresponding to each sound source;
  a position calculating unit, adapted to calculate position information of the sound sources according to the obtained multiple audio signals and position relations between apparatuses used to obtain the multiple audio signals from different sound sources; and
  a sending unit, adapted to send audio streams that carry the audio signals and position information corresponding to the local sound sources.

19. The terminal of claim 18, wherein the position calculating unit comprises:
  a delay estimating module, adapted to estimate relative delays between arrival of the multiple audio signals at the apparatuses used to obtain the multiple audio signals from the sound sources; and
  a sound source positioning module, adapted to calculate the position information of the sound sources according to the estimated relative delays and position relations between the apparatuses used to obtain the multiple audio signals from different sound sources.

20. A 3-dimensional (3D) audio conferencing system, comprising:
  a server, adapted to: obtain more than one audio streams relative to one terminal; select at least one audio stream of the more than one audio streams corresponding to a determination of at least one audio stream of highest energy; allocate identifiers for the obtained at least one audio stream of highest energy relative to the terminal; and combine the obtained at least one audio stream of highest energy relative to the terminal and the identifiers of the at least one audio stream of highest energy; and send the combination to a target terminal; and
  at least one target terminal, adapted to: obtain the at least one audio stream of highest energy that carries identifier information, extract the identifier information of the audio streams, and distribute audio streams that carry a same identifier according to the identifier information, and allocate sound image positions for the distributed audio streams according to the extracted identifier information; and decode the distributed audio streams and perform 3D audio processing on the distributed audio streams according to the sound image positions of the audio streams.

21. The system of claim 20, wherein:
  the server is a master server and the system further comprises:
  at least one slave server, adapted to obtain audio streams of terminals under its control or other servers and combine the obtained audio streams with identifiers of the audio streams; and
  the master server is further adapted to decompose an audio stream combined by the at least one slave server with an identifier to multiple audio streams.

22. The system of claim 20, wherein the target terminal is further adapted to: obtain multiple audio signals from sound sources at a conference site where the terminal is located; perform sound source separation on the obtained multiple audio signals to obtain an audio signal corresponding to each sound source; calculate position information of the sound sources according to the obtained multiple audio signals and apparatuses used to obtain the multiple audio signals from the sound sources; and send to the server audio streams that carry the audio signals and position information corresponding to the sound sources.

* * * * *